A. M. GRAY.
DYNAMO ELECTRIC MACHINE.
APPLICATION FILED OCT. 8, 1910.
1,030,581.
Patented June 25, 1912.
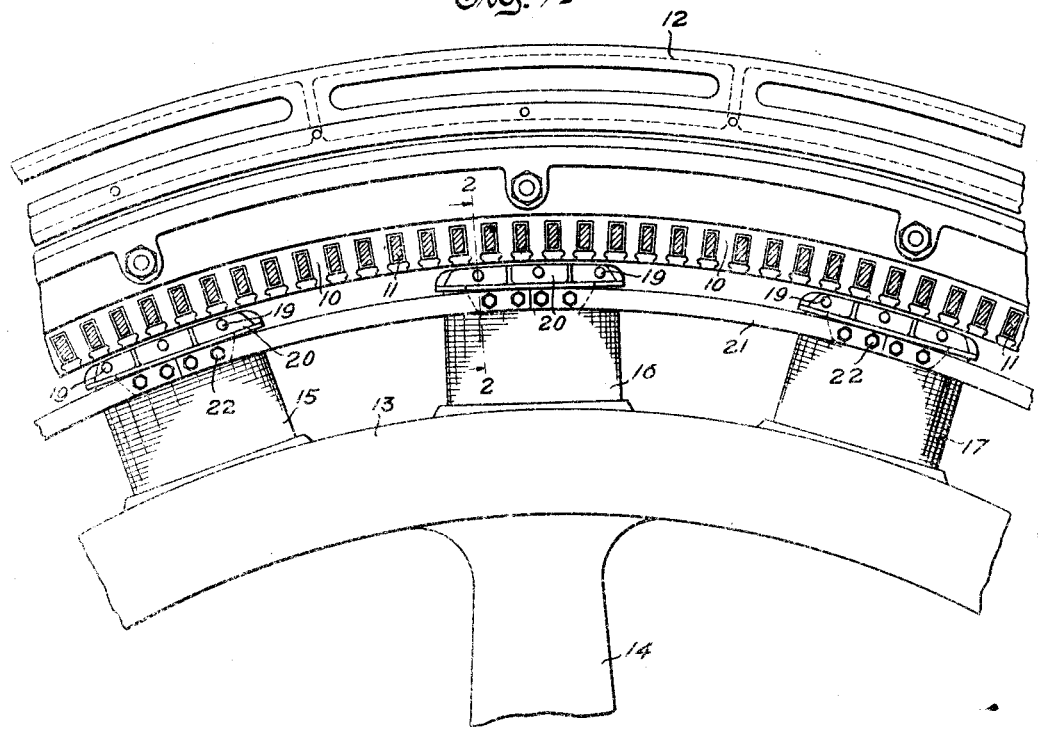
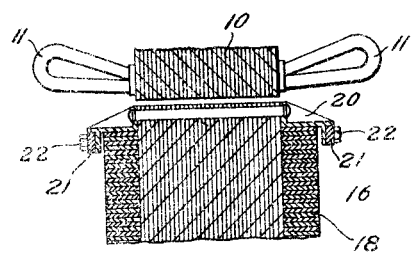
Witnesses
Rob E. Stoll
Chas L. Byron
Inventor
Alexander M. Gray
By Chas E. Lord
Attorney

UNITED STATES PATENT OFFICE.

ALEXANDER M. GRAY, OF MILWAUKEE, WISCONSIN, ASSIGNOR TO ALLIS-CHALMERS COMPANY, A CORPORATION OF NEW JERSEY.

DYNAMO-ELECTRIC MACHINE.

1,030,581.   Specification of Letters Patent.   Patented June 25, 1912.

Application filed October 8, 1910. Serial No. 585,930.

*To all whom it may concern:*

Be it known that I, ALEXANDER M. GRAY, a subject of the King of England, residing at Milwaukee, in the county of Milwaukee and State of Wisconsin, have invented certain new and useful Improvements in Dynamo-Electric Machines, of which the following is a full, clear, and exact specification.

My invention relates to dynamo-electric machines, and particularly to self-starting synchronous machines.

The synchronous motor will not start as such. In order for it to start, it must usually act at that time as an induction motor. In order to facilitate its action as an induction motor, conducting rods transverse both to the magnetic lines of force and to the direction of relative movement between the armature and field member have been embedded in the field poles near their surfaces, the corresponding ends of the rods in the several poles being interconnected. Thus a structure resembling the rotor of a squirrel cage motor is obtained. These interconnected rods also serve as dampers to prevent hunting after the machine has attained synchronous speed. In order to prevent losses while the machine is operating under normal conditions, it is necessary that the damper rods in any pole be spaced apart circumferentially a distance equal to, or an exact multiple of, the distance between two adjacent slots in the armature core, as otherwise there would always be heavy currents circulating in the rods and their end connections. Heretofore, the spacing of the rods has been symmetrical in each pole and the same in all poles. With this construction, the rods in all the poles come opposite slots in the armature core simultaneously. As a result, there are certain dead points from which the motor will not start.

It is the object of my present invention to avoid these dead points, while at the same time retaining the advantages of preventing heavy currents during normal operation. To do this, the rods in the field poles are spaced so that while the rods in any one pole all come opposite armature slots at the same time, the rods in all the poles will not do so. A preferred way of obtaining this result is by spacing the rods in the poles dissymmetrically with respect to the center lines of the poles with which they are respectively associated; the dissymmetry in adjacent poles is preferably equal and opposite.

The various novel features of my invention will be apparent from the description and drawings, and will be particularly pointed out in the claims.

Figure 1 is a partly sectional side elevation of a fragment of a dynamo-electric machine embodying my invention; and Fig. 2 is a section on the line 2—2 of Fig. 1.

The synchronous dynamo-electric machine here illustrated is of the rotating field type, though my invention is not limited thereto.

The stator or armature comprises the usual slotted core 10 having windings 11 embedded in the slots, the whole being supported by a stator frame 12. The slots in the core 10 are regularly spaced in the usual manner.

The rotor comprises a number of field poles mounted on a rim 13, which in turn is supported in the usual manner by a shaft, hub, and radial arms 14. Three poles, 15, 16, and 17, are illustrated. The field poles may have the usual field windings 18. Extending through each pole at right angles both to the magnetic lines of force and the direction of relative movement between field and armature members, and also at right angles to the laminations of the cores if these be laminated, are several conducting rods 19. Corresponding ends of all the rods on each pole, and preferably of all the rods on all the poles, are interconnected. This interconnecting can be accomplished in any desired manner, the arrangement illustrated for doing it being a preferred one merely. As illustrated, at each side of each field pole is a casting 20 having a flat portion which bears against the laminæ of the poles and to which the rods 19 are riveted or otherwise fastened, another flat portion which overlaps the outer ends of the field coils 18 to protect them from being thrown outward by centrifugal force, and a flange portion which extends inward, parallel to the field coils and to which a ring 21 may be fastened, as by means of bolts 22. The flat portion over the end of the field coil may extend over the ring 21 to help hold the latter against the action of centrifugal force. The two flat portions are preferably connected by strengthening webs. The castings 20 connect the corresponding ends of the rods 19 in the same pole, and the rings 21, which may be sectional if desired, connect corresponding ends of rods in different poles.

The gist of my invention lies in the spacing of the rods 19. These are so spaced that the rods on any one pole, say on the pole 15, all come opposite slots in the armature at the same time, but the rods on different poles, as on 15 and 16, come opposite slots in the armature at different times. Preferably when the rods 19 on the pole 15 are opposite slots, the rods 19 on the pole 16 are opposite teeth, as illustrated. In order for all the rods on one pole to come opposite slots at the same time, it is necessary that the rods on such pole be spaced apart distances equal to, or exact multiples of, the distance between adjacent armature slots; as shown, they are spaced apart a distance equal to twice such distance. This prevents losses when the machine is operating at synchronous speed, the rods then serving as dampers. There are various ways for causing the rods 19 on different poles not to come opposite armature slots at the same time, but that illustrated is now deemed preferable. Here the rods on each pole are dissymmetrically spaced, the rods on adjacent poles being dissymmetrically spaced equally in opposite directions so that the same punchings and castings can be used for all poles though in reverse positions on alternate poles. The rods 19 on the pole 16, for instance, while spaced apart distances equal to twice that between adjacent armature slots, are all somewhat to the right of the positions they would occupy if symmetrically spaced with reference to the center line of the pole, preferably by a distance equal to one-fourth that between adjacent armature slots. Those on poles 15 and 17 are also spaced apart among themselves in the same way, but are to the left of the positions they would occupy if symmetrically spaced with reference to the respective center lines of such poles, also preferably by a distance equal to one-fourth that between adjacent armature slots. Thus when the rods 19 on the poles 15 and 17 are opposite slots, those on the poles 16 are opposite armature teeth. With this arrangement there are no dead points, so that the motor can be started from whatever position in which it may happen to stop.

Many modifications may be made in the precise arrangement shown and described, and I aim in my claims to cover all such modifications which do not involve a departure from the spirit and scope of my invention.

What I claim as new is:

1. A synchronous dynamo-electric machine comprising an armature having a slotted core, a field member, and conducting rods fixed relatively to the field member and having their corresponding ends interconnected, the rods being spaced in groups so that a plurality of groups less than the whole number of groups each have rods all of which simultaneously come opposite armature slots.

2. A synchronous dynamo-electric machine comprising an armature having a slotted core, a field member having field poles, conducting rods extending through each field pole transverse to the plane of rotation, and means for interconnecting corresponding ends of said rods, the rods in each pole being spaced so that they come opposite armature slots simultaneously and those in some poles do so at different times from those in others.

3. A synchronous dynamo-electric machine comprising an armature having a slotted core, a field member, and conducting rods extending transversely through the field member and having their corresponding ends interconnected, the rods being arranged in groups so that the rods in each group all come opposite armature slots simultaneously while those in adjacent groups do so dis-simultaneously.

4. A synchronous dynamo-electric machine comprising an armature having a slotted core, a field member having field poles, and conducting rods extending transversely through the field poles and having their corresponding ends interconnected, the rods in each field pole being spaced apart so that they come opposite armature slots at the same time and the rods in adjacent field poles come opposite armature slots at different times.

5. A synchronous dynamo-electric machine comprising an armature, a field member having field poles, and conducting rods extending transversely through each field pole and having their corresponding ends interconnected, rods in each pole being spaced dissymmetrically with respect to the center line of such pole.

6. A synchronous dynamo-electric machine comprising an armature, a field member having projecting field poles, and conducting rods extending transversely through the field poles and having their corresponding ends interconnected, said rods in each pole being spaced dissymmetrically with respect to the center line of such pole and the dissymmetry in adjacent poles being equal and opposite.

7. A synchronous dynamo-electric machine comprising an armature having a slotted core, a field member having field poles and conducting rods extending transversely through each field pole and having their corresponding ends interconnected, the conducting rods on each field pole being spaced symmetrically with respect to a certain line and so that they all come opposite armature slots at the same time and those on adjacent poles are spaced so that when the rods on one pole are opposite armature slots those of the poles adjacent thereto are opposite armature teeth.

8. A synchronous dynamo-electric machine comprising an armature having a slotted core, a field member having field poles, and conducting rods extending transversely through said field poles and having their corresponding ends interconnected, the rods on each pole being spaced symmetrically with respect to a line parallel to the center line of the pole and at a distance therefrom equal to one-fourth the distance between adjacent armature slots.

9. A synchronous dynamo-electric machine comprising an armature having a slotted core, a field member having field poles, and conducting rods extending transversely through said field poles and having their corresponding ends interconnected, the rods on each pole being spaced symmetrically with respect to a line parallel to the center line of the pole and at a distance therefrom equal to one-fourth the distance between adjacent armature slots, such center lines of symmetry on alternate poles being on opposite sides of the center lines of the poles.

10. A synchronous dynamo-electric machine comprising an armature, a field member having field poles, conducting rods extending transversely through said field poles and having their ends interconnected, the mechanical arrangement of the rods on one pole being different from that of those on another but the number of rods on each pole being the same.

11. A synchronous dynamo-electric machine comprising an armature, a field member, conducting rods arranged in groups and extending transversely through the field member, and means for interconnecting corresponding ends of said rods, the spacing between some of the groups being different from that between others.

Milwaukee, Wis., Sept. 5, 1910.

In testimony whereof I affix my signature, in the presence of two witnesses.

ALEXANDER M. GRAY.

Witnesses:
  G. B. SCHLEI,
  CHAS. L. BYRON.